United States Patent [19]

Dawson et al.

[11] Patent Number: 4,899,293

[45] Date of Patent: Feb. 6, 1990

[54] METHOD OF STORAGE AND RETRIEVAL OF DIGITAL MAP DATA BASED UPON A TESSELLATED GEOID SYSTEM

[75] Inventors: John F. Dawson; Edward W. Ronish, both of Albuquerque, N. Mex.

[73] Assignee: Honeywell Inc., Minneapolis, Minn.

[21] Appl. No.: 261,109

[22] Filed: Oct. 24, 1988

[51] Int. Cl.4 .............................................. G06F 15/50
[52] U.S. Cl. .................................... 364/521; 364/522; 340/990; 340/995
[58] Field of Search ........................ 364/522, 521, 518; 434/285, 213, 139, 40; 340/990, 995

[56] References Cited

U.S. PATENT DOCUMENTS

| | | | |
|---|---|---|---|
| 4,360,876 | 11/1982 | Girault et al. | 364/449 |
| 4,463,380 | 7/1984 | Hooks, Jr. | 358/160 |
| 4,484,192 | 11/1984 | Seitz et al. | 340/995 |
| 4,660,157 | 4/1987 | Beckwith et al. | 364/522 |
| 4,807,158 | 2/1989 | Blauton et al. | 364/521 |

OTHER PUBLICATIONS

"Optical Tessellated Geoid Management for Digital Map", by Edward W. Ronish, Digital Avionics Systems Conference Technical Symposium, Aug. 1986.

Primary Examiner—Gary V. Harkcom
Assistant Examiner—Raymond J. Bayerl
Attorney, Agent, or Firm—Haugen & Nikolai

[57] ABSTRACT

A method for storage and retrieval of digital map data representative of a tessellated sphere including five zones. Firstly, the number of tessellations for each zone is defined. Secondly, the range of each zone is defined. Next, the radius of the sphere is defined. A sphereical data base is then created by warping the digital map data into the spherical data base by latitude and longitude. Finally, data from the spherical data base is retrieved and the data may be displayed on a cathode ray tube (CRT) display or a flat panel liquid crystal display.

5 Claims, 4 Drawing Sheets

| ROW | LOLAT | UPLAT | LOWID | UPWID | NUM | CONVER | IDEAL | ERRHT |
|-----|-------|-------|-------|-------|-----|--------|-------|-------|
| 24 | 49.394 | 50.926 | 3.350 | 3.244 | 153 | 0.9685 | 1.1999 | 1.1999 |
| 19 | 41.005 | 42.780 | 3.884 | 3.778 | 153 | 0.9726 | 1.0348 | 1.0348 |
| 12 | 27.278 | 29.369 | 4.574 | 4.485 | 153 | 0.9805 | 0.8786 | 0.8786 |

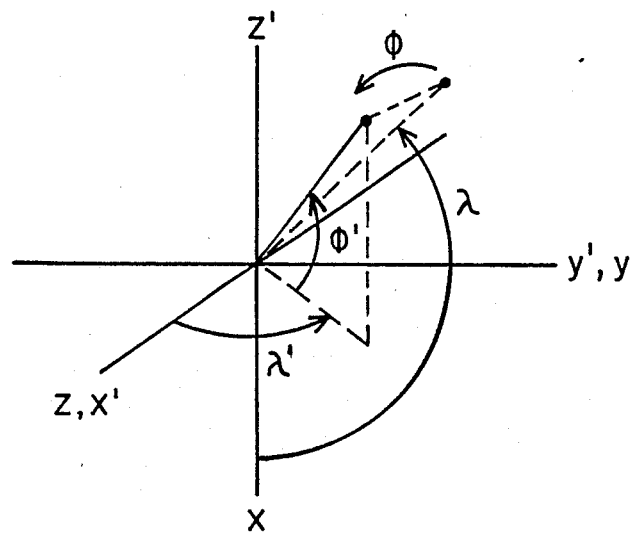
Fig. 5
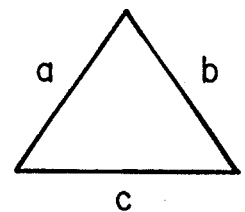
Fig. 6
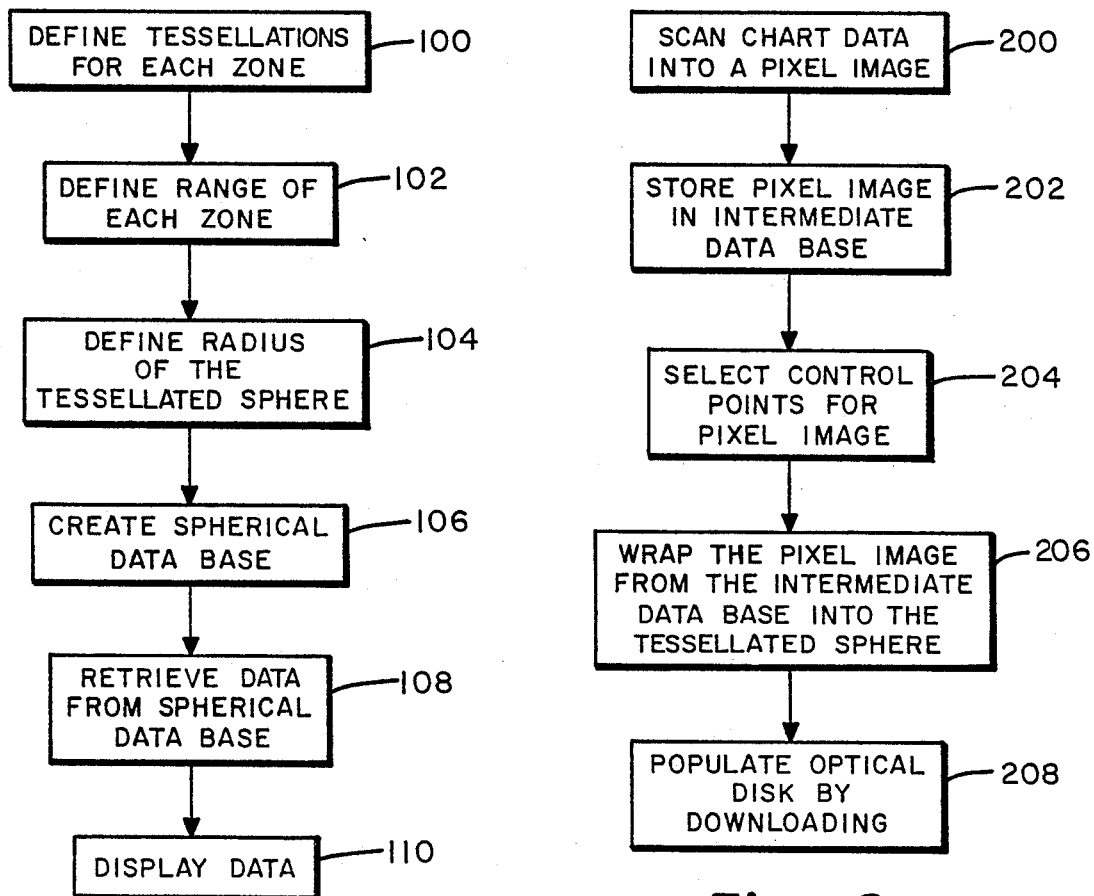
Fig. 7
Fig. 8

METHOD OF STORAGE AND RETRIEVAL OF DIGITAL MAP DATA BASED UPON A TESSELLATED GEOID SYSTEM

GOVERNMENTAL RIGHTS

The United States Government has funded portions of the development of this invention and has certain rights therein.

BACKGROUND OF THE INVENTION

1. Field of the Invention

The invention relates generally to data processing, and more particularly to a method for the efficient storage and retrieval of digital map data based on a common global coordinate system constructed as a tessellated geoid having polar, equatorial and temperate zones.

2. Discussion of the Prior Art

A significant problem facing the fielding of a production airborne digital map system is accommodating the variety of data formats necessary for the diversity of mission navigational requirements. The Digital Land Mass System (DLMS) data base produced by the Defense Mapping Agency (DMA) consists of Digital Terrain Elevation Data (DTED) and Digital Feature Analysis Data (DFAD) in a digital format on magnetic media. FIG. 1 generally illustrates this system where data is rendered into a pixel image by a Digital Map Computer (DMC) 10 which is installed aboard a military aircraft. The pixel image is converted into a display 11 for projection onto a CRT or reproduction on a flat panel type of display 15 Similarly, aeronautical charts are digitized into pixel data and stored on a plurality of Digital Memory Units (DMU) 12 which serve as the mass storage device for the DMC. A DMU typically uses information stored in digital form on an optical disk cartridge 13. Other data includes digitized photographs, mission data, threat/intelligence data, checklists and command files.

Storing this diverse data, managing it, and retrieving it rapidly for display is a complex task. Optimizing a storage and retrieval scheme for one data type has proved to be inefficient for a different type. Coordinate systems carried for each different data type have increased the overall complexity and cost of such systems since separate projection equations must be invoked depending upon data type.

Prior art for navigation in the airborne cockpit consists of two different methodologies. The first requires that the aviator cut up aeronautical charts into strips, which when pasted together, provide coverage for his flight plan. These strips of chart are bound in a booklet and strapped to the aviator's knee. The aviator draws his planned flight path on the charts and makes other relevant notations directly on the paper.

The second known method consists of a film strip and projection system. FIG. 2 illustrates a typical approach for producing a filmstrip data base from existing paper maps. For example, 45 inch by 58 inch paper map 14 may first be reduced by a factor of 6:1 to a microcard 20. Then sixteen microcards 20 may be mounted together in a paste-up 22, which is photographed onto the 33 mm filmstrip 24 with a further reduction of 2.5:1. The resulting map displayed on the color CRT is the same size as the paper map. The filmstrip is typically 20 meters long and contains up to 512 24 mm×36 mm slides. The film is photographed with about a 50% overlap so that there are no "black corners" as the map is traversed.

The shortcomings of the strip chart prior art are that it is limited in scope of coverage and flexibility if the aviator deviates from the original flight plan. The different scales cannot be nested or manipulated and overlays that are written on cannot be decluttered. Magnification of line details such as contour lines and small text font cannot be magnified nor can any other forms of manipulation associated with a digital image be performed. The various projections cannot be aligned so that parallel lines from one chart to another would connect on the filmstrip. Flight paths traverse a filmstrip too quickly if the path is perpendicular to the strip. This leads to annoying "thrashing" since the filmstrip is constantly rewinding to access the correct frame.

In both the cut and pasted strip charts and the remote map reader filmstrips, digital data cannot be accommodated. Indeed, the processing for the rendering and display of such information did not exist until the introduction of the digital map computer. For aeronautical charts, changes between map projections cannot be adjusted with this storage scheme. A Polar Stereographic (PS) projection of a chart at high latitudes is filmed and displayed as such. A Lambert Conformal Conic (LCC) projection at lower latitudes is similarly processed. The boundary between an LCC chart and a PS chart is significantly noticeable as the aircraft flies from one map sheet to the other map sheet. The discontinuities at these seams is objectionable to an aviator. Even within the same type of projection, charts cannot be made to line up exactly and the seams are quite noticeable.

The invention provides advantages and features not found in the prior art in that, as one feature of the invention, it presents a common framework not only for aeronautical charts of different scales and projections of a given gaming area, but also for other digitized pixel information such as aerial reconnaissance photographs and LandSat imagery and digital information such as Digital Terrain Elevation Data. By compensating for varying coordinate systems and projection equations, the invention allows diverse data to be stored and retrieved in a single format. This feature of the invention greatly simplifies the processing and display hardware of the Digital Map Computer. The treatment of the polar zones by the invention is a completely new and improved approach. Other digital map computers utilize a small, contiguous gaming area of square segments and do not address transpolar navigation. The discontiguous gaming area is known to some extent but no other known system is capable of reproducing the invention's long flight paths.

Another advantage of the invention is that the tessellated geoid's common coordinate system and minimal distortion overcomes the shortcomings of the prior art. By controlling the upper and lower cell dimensions of a tile (or tessellation) through the use of zones, discontiguous gaming areas do not exceed the maximum allowable distortion regardless of the distance from the origin of the gaming area. Since the data is stored in cells based on latitude and longitude and not on any particular map projection, a seamless transition from cell to cell is achieved. The display of data is limited only by the cells populated in the data base and extends easily beyond the coverage required for a particular flight plan. DTED data is readily accommodated in the tessellated structure as the distinct elevation posts are formatted in arc second measure of latitude and longitude.

SUMMARY OF THE INVENTION

A method for storage and retrieval of digital map data representative of a tessellated sphere including five zones is disclosed. Firstly, the number of tessellations for each zone is defined. Secondly, the range of each zone is defined. Next, the radius of the sphere is defined. A spherical data base is then created by warping the digital map data into the spherical data base by latitude and longitude. Finally, data from the spherical data base is retrieved and the data may be displayed on a CRT display or a flat panel liquid crystal display.

It is a primary object of the invention to provide a method of storing and retrieving digital map data in cells based on latitude and longitude so as to achieve a seamless transition from cell to cell and having a coverage of tessellated geoid having five zones.

It is another primary object of the invention to provide an improved method for storage and retrieval of aeronautical chart data utilizing an optical disk storage medium.

It is yet another object of the invention to provide an improved method for providing information to a digital map computer which can be displayed and coordinated to a flight plane for an aircraft.

It is yet another objection of the invention to provide a common framework for various types of aeronautical charts and other digitized information to be stored and retrieved in a single format by compensating for varying coordinate systems and projection equations.

Other objects, features and advantages of the invention will become apparent through the detailed specification, claims and drawings herein. A brief description of the drawings follows wherein like numerals refer to like elements.

BRIEF DESCRIPTION OF THE DRAWINGS

FIG. 5 is a graphical representation of the polar zone rotational calculations employed by the invention.

FIG. 6 is a graphical representation of certain parameters used in the polar zone rotational calculations.

FIG. 7 is an illustrative flow chart of the method of the invention for storage, and retrieval of digital map data.

FIG. 8 is an illustrative flow chart of the method of the invention for storage and retrieval of aeronautical chart data.

DESCRIPTION OF THE PREFERRED EMBODIMENT

Figure 3:
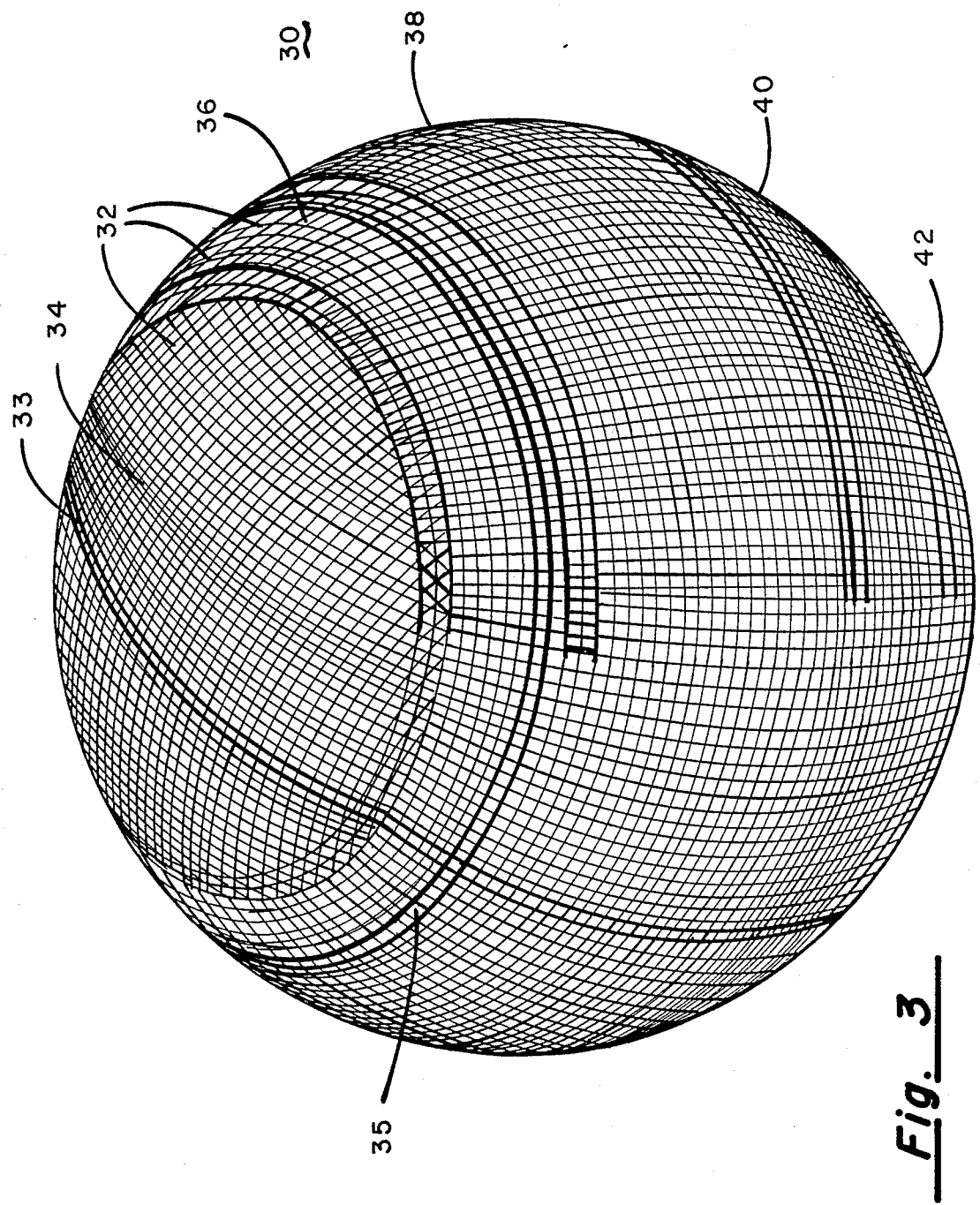
FIG. 3 is a pictorial representation of one embodiment of the tessellated geoid model of the invention.

FIG. 3 shows schematically an illustration of the tessellated geoid (or sphere) structure 30 employed by the invention. The tessellated geoid 30 models pictorially a data base structure for the retrieval of digital map data in the form of a plurality of digital map segments 32. As is illustrated in FIG. 3, a segment 32 is a section of digital data that is bounded by constant latitude and longitude lines. The data base structure may be defined as a constant arc measure data base or an equirectangular map data base structure.

Data Base Definition

Still referring to FIG. 3, the data base is defined by the number of zones, number of tessellations, range of zones, and radius of the earth. In one embodiment of the invention, the segments 32 each represent part of a sphere 30 which describes the earth. Real data, such as aeronautical chart data, is warped into a spherical data base by latitude and longitude. The number of zones is advantageously set at 5 for the tessellated sphere. The zones comprise the north polar 34, north temperate 36, equatorial 38, south temperate 40, and south polar 42.

Those skilled in the art will recognize that the choice of number of zones is a matter of design choice and may be more or less than the five zones selected for this embodiment of the invention. The number of tessellations 32 is set at 190 for the equatorial, north polar and south polar zones. The number of tessellations is set at 152 for the north temperate and south temperate zones. The number of tessellations for latitude is set at 195. The radius of the earth is defined as 125.3265 inches at 1:2000000 scale. Those skilled in the art will understand that all of the above factors are variable and that this description is meant to serve as an illustrative example.

Tessellation Definition

The geoid 30 has a plurality of latitudinal tessellations 33 and longitudinal tessellations 35. Representative tessellations are shown in FIG. 3. The total number of tessellations determines the arc measure of a segment. In one illustrative example of the invention, for the arc measure in latitude, the number of tessellations is set at 195. The arc measure is then defined as $360/195 = 1.846153846$. This means that in this example a segment spans 360/195 degrees in latitude. In the same example, for the equatorial zone 38, the number of tessellations is set at 190. The arc measure is then defined as $360/190 = 1.894736842$ degrees longitude. Therefore, a segment in the equatorial zone has an arc measure of 360/190 degrees longitude and 360/195 degrees latitude. The arc measure for the north pole and south pole is the same as the equator, and the segments have the same size as for the equator. The arc measure for the temperate zone is $360/152 = 2.368421053$. This means that the segment in the temperate zone has an arc measure of 360/152 degrees in longitude and 360/195 degrees in latitude.

Segment Row and Column

Figure 4:
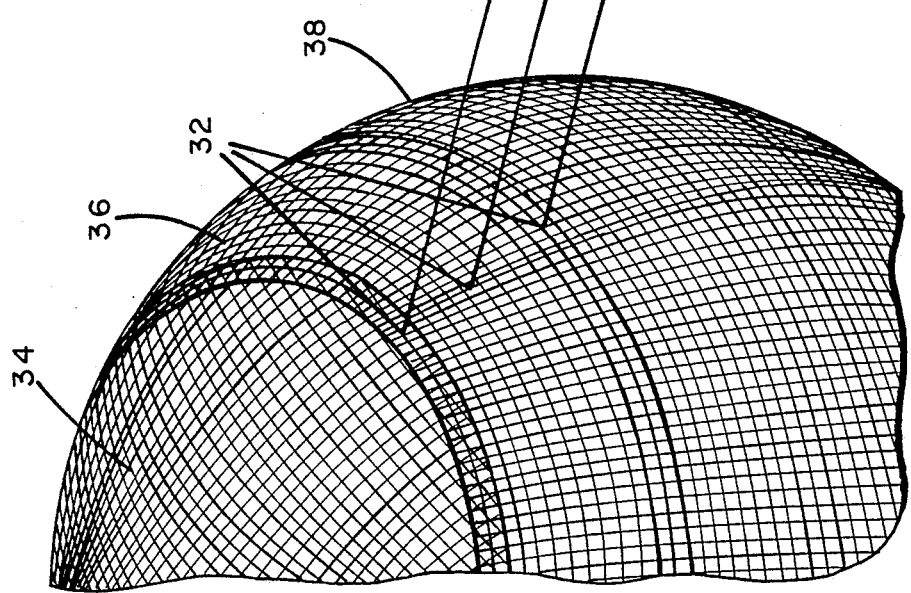
FIG. 4 is an illustration of an example of segment calculation as provided by the invention.

As best illustrated in FIG. 3, the data base of the invention is organized by rows and columns containing segment information as explained in more detail below with respect to the latitude and longitude table provided by the invention. A segment 32 is defined in the data base of the invention by the latitude and longitude of the southwest corner of he segment. To find the row of a segment, one divides by the degrees per segment. The degrees per segment in the illustrative example is 360/195. So, for example, a segment at 36.5 degrees north would be in the row with the truncated integer found by dividing 36.5 by 360/195. This is row 19 as shown in FIG. 4. The row calculation is the same for all the zones, but the column calculation differs from zone to zone because the degrees per segment in longitude differs from zone to zone. In the equatorial zone, the column is determined by dividing by the degrees per segment in longitude. In the illustrative example, this means dividing the longitude by 360/190. A longitude of 90 degrees east would be column 47. This is the truncated integer for 90 divided by 360/190.

Negative Rows and Columns

In one example of the data base employed by the invention, the rows are negative for southern latitudes and the columns are negative for western longitudes. For example, a latitude of 36 degrees south would be interpreted as −36.0 degrees. This would lead to row number −20. The row number is one less than the truncated integer. The column number depends on the zone. For example, a longitude of 90 degrees west would be column −48. This comes from dividing −90 by 360/190 and taking one less than the truncated integer as the column. Those skilled in the art will recognize that other conventions for designating zones may be employed.

Scale Changes

Figures 1, 2:
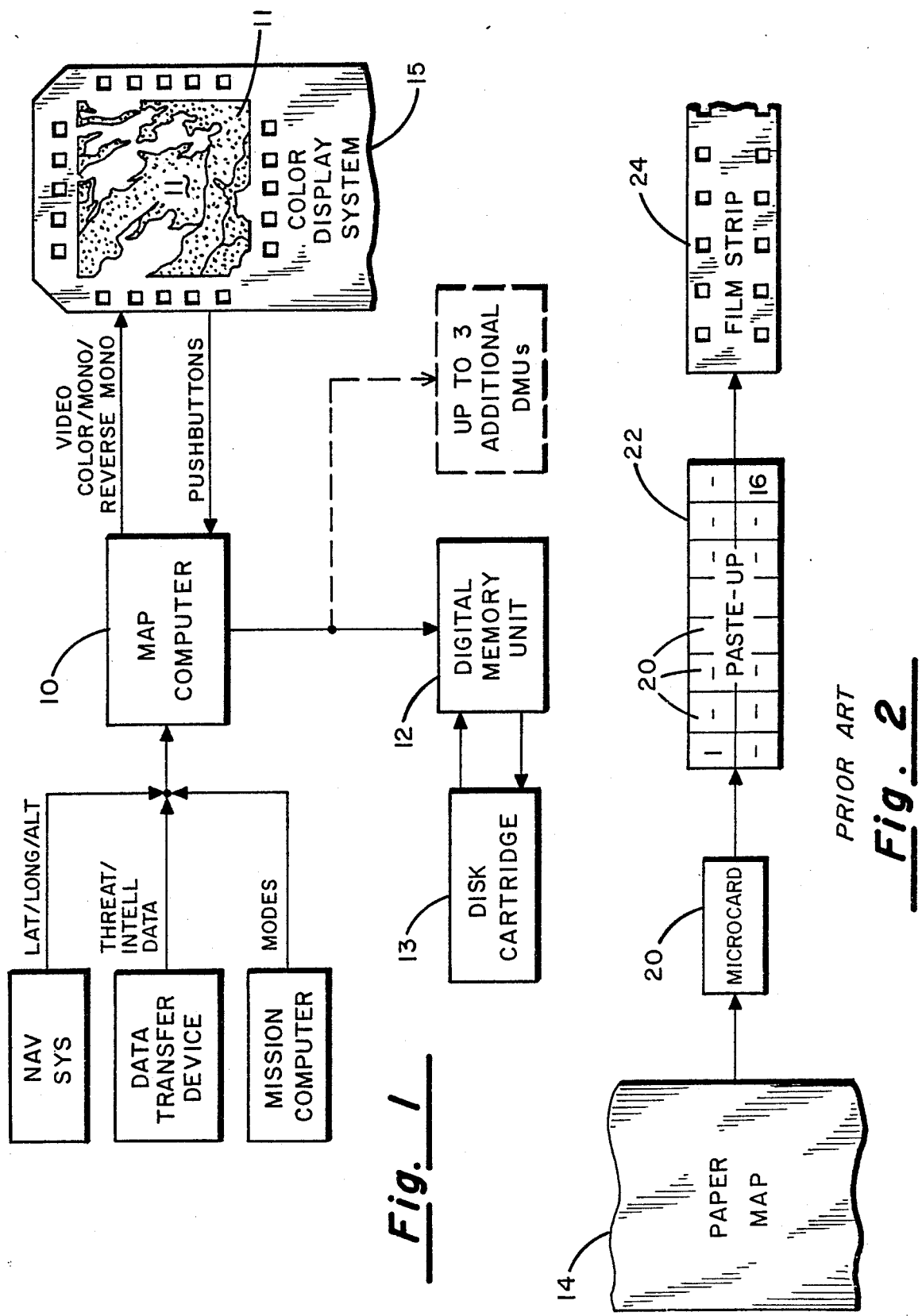
FIG. 1 is a block diagram of a typical Digital Map System including a DMC and DMU.
FIG. 2 is a block diagram of the prior art filmstrip data base creation process.

All of the degrees per segment are a function of the scale of the tessellation of the digitized data. The scale in turn is a function of the data. For chart data typical scales are 1:2M and 1:250K. One embodiment of the invention's tessellated sphere model is defined at a scale of 1:104.22 NMI for DLMS data and 1:2M for chart data. The chart data has twice as many segments per row and twice as many segments per column in the DLMS. That is, a segment at the highest scale in DLMS (104.22 NMI) would have 360/195 degrees per row, but a segment for chart at the 1:2M scale would have 360/(195*2)=0.923076923 degrees per row. The longitude would be 360/190 for the DLMS segment in the equatorial zone, and 360/(190*2) for the chart segment. Other scales are subdivisions of the largest scale. The largest scale is 1:2M for chart and 104.22 NMI for DLMS. For a scale of 1:1M for chart, the degrees per row is ½ of that for 1:2M. Thus the degrees per row for chart at 1:1M scale would be 360/(195*4) and the degrees per column for chart at 1:1M scale would be 360/(190*4) in the equatorial zone. When the data is displayed on the screen (FIG. 1), the DMC will select approximately 1 DLMS segment or 4 chart segments to tie in the display. This insures that the display is 104.22 NMI×104.22 NMI for DLMS and chart at the highest scale.

Zone Boundaries

Each zone is defined by a bottom and a top row. In one illustrative example of the invention, the equatorial zone is from row −17 to row 17. The north temperate zone is from row 16 to row 28. The polar zone is from row −25 to row 25. There is an overlap of row between adjacent zone. The zones are set to overlap by one row for DLMS data. The highest scale which is 1:2 Million for chart translates to 104.22 nautical mile scale for DLMS (484 posts per inch displayed on a 5 inch×5 inch CRT). The zone boundary is defined in the middle of the overlap. In one illustrative example of the invention, the equatorial to temperate boundary is at 31.3846 degrees. The temperate to polar boundary is at 51.69228.

Referring now to FIG. 7, the steps of the method of the invention as explained above are shown in flow chart form. The steps comprise defining tessellations for each zone 100, defining the range of each zone 102, defining the radius of the tessellated sphere 104, creating a spherical data base 106, retrieving data from the spherical data base 108, and displaying data at step 110.

The following is a listing of a computer FORTRAN program to create the table for one embodiment of the tessellated sphere model as employed by the invention. Those skilled in the art will recognize that such a program may be expressed in various forms and languages to accomplish the same task as taught by this invention.

```
c GLOBAL COORDINATE SYSTEM
c the scan is set at a constant 127.3888 lines per inch in the c
vertical
c itop0        top row of equatorial zone
c itop1        top row of temperate zone
c itop2        top row of polar zone
c ibot0        bottom row of equatorial zone
c ibot1        bottom row of temperate zone
c ibot2        bottom row of polar zone
c num0             number of tessellations for equatorial zone
c num1             number of tessellations for temperate zone
c num2             number of tessellations for polar zone
c 1.           Calculation is for DMA 104.22 nm scale
c 2.           Angle is the same for latitude and longitude in
a given row
c 3.           Polar zone is rotated equatorial zone
c generate the tessellated sphere using overlapping regions
        real rlats(0:49)
        real slats(0:3)
        integer ntess(0:3)
        data slats/14.694,39.181,62.0,0.0/
        data itop0,itop1,itop2/17,28,25/
        data ibot0,ibot1,ibot2/0,16,0/
        write(6,170)
170     format(' TESSELLATED SPHERE')
        call tess(pi,ntess,r,rlats,r1,rad,slats)
        num0 = ntess(0)
        num1 = ntess(1)
        num2 = ntess(2)
c for each latitude calculate the number of tessellations
        write(6,190) r
190     format(' radius of earth = ',f8.4, 'inches at 1:2M')
        write(6,195) rlats(itop0)*rad
195     format(1x,'Equator-Temperate Transition latitude=',f20.12)
        write(6,200)
200     format(' Equator system '/,
      + ' row lolat uplat lowid upwid num',
      + ' conver ideal lines area')
        do i-ibot0,itop0
        rlat = rlats(i)
        ulat = rlats(i+1)
        rlow = r*cos(rlat)
        rup = r*cos(ulat)
        slow = 2.*pi*rlow
        sup = 2.*pi*rup
        nlow = num0
        wlow = slow/nlow
        wup = sup/nlow
        con = wup/wlow
        err = r1/wlow
        errht = r1/(r*(ulat−rat))
        rlines = 512.0/wlow
        call coverage(errht,wlow,wup,area)
        write(6,210) i,rlat*rad,ulat*rad,wlow,wup,nlow,con,err,
      + rlines,area
210
format(1x.i3,4(1x,f6.3),1(1x,i5),2(1x,f6.4),1x,f6.2,1x,f6.4)
        enddo
c temperate zone
        write(6,215) rlats(itop1)*rad
215     format(1x,'Temperate-Polar Transition latitude=',f20.12)
        write(6,220)
220     format(' temperate zone system '/,
      + ' row lolat uplat lowid upwid num',
      + ' conver ideal lines area')
        do i=ibot1,itop1
        rlat = rlats(i)
        ulat = rlats(i+1)
        rlow = r*cos(rlat)
        rup = r*cos(ulat)
``` c GLOBAL COORDINATE SYSTEM

```
            slow = 2.*pi*rlow
            sup = 2.*pi*rup
            nlow = num1
            wlow = slow/nlow
            wup = sup/nlow
            con = wup/wlow
            err = r1/wlow
            errht = r1/(r*(ulat-rlat))
            rlines = 512.0/wlow
            call coverage(errht,wlow,wup,area)
            write(6,210) i,rlat*rad,ulat*rad,wlow,wup,nlow,con,err,
          + rlines,are
         enddo
c polar zone
         write(6,300)
300      format(' Polar system '/,
       + ' row lolat uplat lowid upwid num',
       + ' conver ideal lines area')
         do i = ibot2,itop2
            rlat = rlats(i)
            ulat = rlats(i+1)
            rlow = r*cos(rlat)
            rup = r*cos(ulat)
            slow = 2.*pi*rlow
            sup = 2.*pi*rup
            nlow = num2
            wlow = slow/nlow
            wup = sup/nlow
            con = wup/wlow
            err = r1/wlow
            errht - r1/(r*(ulat-rlat))
            rlines - 512.0/wlow
            call coverage(errht,wlow,wup,area)
            write(6,210) i,rlat*rad,ulat*rad,wlow,wup,nlow,con,err,
          + rlines,area
         enddo
         stop
         end
***********************************************************
***
c call area of a trapezoid
         subroutine coverage(errht,wlow,wup,area)
         r1 = 4.01919164 ! inches on a side optimum
         wside = errht*r1
         d = (wlow = wup)/2.0
         h = sqrt(wside**2 - d**2)
         area = (wlow + wup)*h/2.0
         area = area/144.0
         return
         end
c ***********************************************************
c generate the tessellated sphere
         subroutine tess(pi,ntess,r,rlats,r1,rad,slats)
         real rlats(0:49),slats(0:3)
         integer ntess(0:3)
         pi = 3.14159265
         rad = 180.0/pi
         r = 125.3264962 ! inches at 1:2M
         r1 = 4.01919164 ! inches on a side optimum
         s = 2.*pi*r ! initialize angle of tessellation
c for each standard latitude, calculate the number of tessellations
         do i=0,2
            rlat = slats(i)
            rlow = r*cosd(rlat)
            slow = 2.*pi*rlow
            ntess(i) = slow/r1 + 5
         enddo
         ntess(2) = ntess(0)
         ntes(3) = 195
         write(6,230) ntess
``` c GLOBAL COORDINATE SYSTEM

```
230      format(' number of tessellations in equator zone =',i5/,
       + ' number of tessellations in temperate zone=',i5/,
       + ' number of tessellations in polar zone =',i5/,
       + ' number of tessellations in latitude =',i5)
240      format(' zone system #',i1/,
       + ' row lolat uplat lowid upwid num',
       + ' conver ideal errht')
         do i=0,1
            write(6,240) i
            call clats(pi,ntess,r,rlats,r1,rad,slats,i)
         enddo
         return
         end
***********************************************************
***
c calculate the latitudes for a zone
         subroutine clats(pi,ntess,r,rlats,r1,rad,slats,izone)
         real rlats (0:49),slats(0:3)
         integer ntess(0:3)
         rlat = 0
         nlat = ntess(3) ! lowest integer to select 4.01 inches
         nlow = ntess(izone)
         delta = 6.283185307/nlat
         do i-0,40
            rlats(i) = rlat
            rlow = r*cos(rlat)
            slow = 2.*pi*rlow
            wlow = slow/nlow
            ulat = rlat + delta
            rup = r*cos(ulat)
            sup = 2.*pi*rup
            nup = nlow
            wup = sup/nup
            con = wup/wlow
            err = r1/wlow
            errht = r1/(r*(ulat-rlat))
            write(6,210)
       i,rlat*rad,ulat*rad,wlow,wup,nlow,con,err,errht
210      format(1x,i3,4(1x,f6.3),1(1x,i5),3(1x,f6.4))
            rlat = rlat + delta
         enddo
         return
         end
```

Latitude and Longitude Table

The following table is an example of the output from the above FORTRAN program. The table included shows the latitude of each row in the model 4 tessellated sphere at a scale of 1:4M. The definition of abbreviations is:

lolat - lower latitude of row
uplat - upper latitude of row
lowid - width in inches of bottom of segment
upwid - width in inches of top of segment
num - number of tessellations in the row
conver - division of upwid by lowid, the convergence
ideal - division of 4.10919164 by lowid
errht - division of 4.10919164 by height of segment
number of tessellations in equator zone = 190
number of tessellations in temperate zone = 152
number of tessellations in polar zone = 190
number of tessellations in latitude = 195
radius of earth = 125.3265 inches at 1:2M
Equator-Temperate Transition latitude = 31.384611129761

| | | | | Polar System | | | | | |
|---|---|---|---|---|---|---|---|---|---|
| row | lolat | uplat | lowid | upwid | num | conver | ideal | lines | area |
| 0 | 0.000 | 1.846 | 4.144 | 4.142 | 190 | 0.9995 | 0.9698 | 123.54 | 0.1151 |
| 1 | 1.846 | 3.692 | 4.142 | 4.136 | 190 | 0.9984 | 0.9703 | 123.60 | 0.1150 |
| 2 | 3.692 | 5.538 | 4.136 | 4.125 | 190 | 0.9974 | 0.9718 | 123.80 | 0.1147 |
| 3 | 5.538 | 7.385 | 4.125 | 4.110 | 190 | 0.9964 | 0.9743 | 124.12 | 0.1144 |

-continued

| | | | | Polar System | | | | | |
|---|---|---|---|---|---|---|---|---|---|
| row | lolat | uplat | lowid | upwid | num | conver | ideal | lines | area |
| 4 | 7.385 | 9.231 | 4.110 | 4.091 | 190 | 0.9953 | 0.9779 | 124.57 | 0.1139 |
| 5 | 9.231 | 11.077 | 4.091 | 4.067 | 190 | 0.9942 | 0.9825 | 125.16 | 0.1133 |
| 6 | 11.077 | 12.923 | 4.067 | 4.039 | 190 | 0.9932 | 0.9882 | 125.88 | 0.1126 |
| 7 | 12.923 | 14.769 | 4.039 | 4.008 | 190 | 0.9921 | 0.9950 | 126.75 | 0.1118 |
| 8 | 14.769 | 16.615 | 4.008 | 3.971 | 190 | 0.9910 | 1.0029 | 127.76 | 0.1108 |
| 9 | 16.615 | 18.462 | 3.971 | 3.931 | 190 | 0.9899 | 1.0120 | 128.92 | 0.1098 |
| 10 | 18.462 | 20.308 | 3.931 | 3.887 | 190 | 0.9887 | 1.0224 | 130.24 | 0.1086 |
| 11 | 20.308 | 22.154 | 3.887 | 3.839 | 190 | 0.9876 | 1.0340 | 131.73 | 0.1073 |
| 12 | 22.154 | 24.000 | 3.839 | 3.786 | 190 | 0.9864 | 1.0471 | 133.39 | 0.1059 |
| 13 | 24.000 | 25.846 | 3.786 | 3.730 | 190 | 0.9851 | 1.0615 | 135.23 | 0.1044 |
| 14 | 25.846 | 27.692 | 3.730 | 3.670 | 190 | 0.9839 | 1.0776 | 137.27 | 0.1028 |
| 15 | 27.692 | 29.538 | 3.670 | 3.606 | 190 | 0.9826 | 1.0952 | 139.52 | 0.1011 |
| 16 | 29.538 | 31.385 | 3.606 | 3.538 | 190 | 0.9812 | 1.1146 | 141.99 | 0.0992 |
| 17 | 31.385 | 33.231 | 3.538 | 3.467 | 190 | 0.9798 | 1.1360 | 144.71 | 0.0973 |
| 18 | 33.231 | 35.077 | 3.467 | 3.392 | 190 | 0.9784 | 1.1594 | 147.69 | 0.0953 |
| 19 | 35.077 | 36.923 | 3.392 | 3.313 | 190 | 0.9769 | 1.1850 | 150.95 | 0.0931 |
| 20 | 36.923 | 38.769 | 3.313 | 3.231 | 190 | 0.9753 | 1.2131 | 154.53 | 0.0909 |
| 21 | 38.769 | 40.615 | 3.231 | 3.146 | 190 | 0.9736 | 1.2438 | 158.45 | 0.0886 |
| 22 | 40.615 | 42.462 | 3.146 | 3.058 | 190 | 0.9719 | 1.2775 | 162.74 | 0.0862 |
| 23 | 42.462 | 44.308 | 3.058 | 2.966 | 190 | 0.9700 | 1.3145 | 167.46 | 0.0837 |
| 24 | 44.308 | 46.154 | 2.966 | 2.871 | 190 | 0.9680 | 1.3552 | 172.64 | 0.0811 |
| 25 | 46.154 | 48.000 | 2.871 | 2.773 | 190 | 0.9659 | 1.3999 | 178.34 | 0.0784 |

Aeronautical Charts

Having described the basic structure of the method of the invention, we now turn to a description of one example of an application of the invention as used to store and retrieve information from aeronautical charts. Aeronautical charts are special maps used by military pilots. These charts contain map data for towns, roads and terrain, but they also contain many more symbols than a "normal" map. Each chart has a grid of latitude and longitude lines. These are spaced at most by 2 inches. These grid intersections are used as control points to warp the chart into a tessellated sphere. The aeronautical charts are named according to scale. A 1:2M scale is called a Jet Navigation Chart or JNC. On the JNC, 1 chart inch represents 2 million ground inches. A 1:1M is called the Operational Navigation Chart or ONC. A 1:500K Chart is called the Tactical Pilotage Chart or TPC. A 1:250K chart is called the Joint Operational Graphic or JOG chart.

An ideal chart is perfectly flat, but most charts contain folds which will appear in the final product. To minimize the problem with chart folds, the chart is placed on a flat scanning table and covered with a heavy piece of flat glass.

An area of 14 inches × 14 inches makes up a typical scan at 256 lines per inch. A scanning table of the type typically used can scan out more or less than this, but this density of scan is nominal for the tessellated geoid of the invention.

An initial scan is done by a standard routine which scans in the 14 × 14 inch section into a 4096 × 4096 pixel image. This is called the intermediate data base file or IMDB. The scan typically takes about 15 minutes and each color, red, green, and blue are scanned separately. The final image is 4096 × 4096 × 8 × 3 bytes in size.

The next step is to select the control points for the image. A latitude, longitude pair is associated with the nearest pixel in the scan file. Up to 25 control points are picked for each scan, and the accuracy is within a pixel.

The third step is to warp the scan into the processed maps data base or PMDB. This data base advantageously consists of a single zone with 24 bits per pixel or 8 bits per color. The zone advantageously runs from −70 degrees latitude to +70 latitude. The zone is divided into blocks or "blk" files. In one embodiment of the invention, a superdirectory file keeps track of the names of the blk files. Another superdirectory file keeps track of the latitude and longitude extent of each scan in the IMDB. The PMDB is a spherical data base, each pixel has a latitude and longitude. The degrees per latitude in the 1:2M scale is 1.4 and the degrees per longitude is 1.8 per blk file. Each blk file has 800 columns by 600 rows.

The fourth step is to populate the optical disk image. This is done by the downsample from the PMDB. Each pixel used in the tessellated sphere of the invention corresponds to four PMDB pixels. Each PMDB pixel has a known latitude, longitude pair. The operator picks a range of segments by latitude and longitude extent. Each segment in the tessellated sphere is selected one at a time. Then for each pixel in that segment, the nearest four pixels in the PMDB are averaged together until the segment is full. Then the segment is written out to the optical disk image and the next segment started.

Polynomial Warp Equations

The warp of the pixels in the IMDB into the PMDB is controlled by a polynomial warp equation. Generally, a third order warp equation is used. The equation is of the form:

$$x = b0*n + b1*lon + b2*lat + b3*lon*lat + b4*lon*lon +$$
$$b5*lat*lat + b6*lat*lat*lon + b7*lon*lon*lat + b8*lon*lon*lon +$$
$$b9*lat*lat*lat$$

where $lon$ = longitude of the point in degrees $lat$ = latitude of the point in degrees $x,y$ = pixel location of the lat,lon pair.

The matrix for this equation is defined as follows;

$$p0 = 1$$
$$p1 = lon$$
$$p2 = lat$$

-continued p3 = lon * lat p4 = lon * lon p5 = lat * lat p6 = lat * lat *lon p7 = lon * lon * lat p8 = lon * lon * lon p9 = lat * lat * lat mat(i,j) = sum(pi * pj)

e.g. mat(0,0) = sum(p0 * p0) = sum(1 * 1) = number of points mat(0,1) = sum(p0 * p1) = sum(1 * lon) = sum(lon)

The equation to be solved is of the form AX=B. Here A =mat(i,j). X=is the coefficients to be determined and B=a linear matrix where B(i)=sum(pi*xi). e.g. B(0)=sum(p0*x)=sum of all the x pixel locations for all the control points.

Generally, 25 control points are chosen. A minimum of 9 control points is needed for a third order polynomial, but he fit becomes better if more control points are selected.

The Polar Zone

The lines of longitude converge together at the north and south poles, therefore, the invention was created to enable the Digital Map Display to "fly" (i.e., simulate an aircraft flight path) over the polar regions. This new method consists of using a rotated equatorial zone as the basis for the grid of segment lines that cover the equatorial zone being rotated 90 degrees, so that the intersection of the Prime Meridian and the Equator now lies at the south pole, and the intersection of longitude 180 and the equator now lies at the north pole. This rotation accomplished, one has only to write a conversion routine using well-known computer programming techniques to translate back and forth between the rotated latitude, longitude and normal coordinates.

As shown in FIG. 5, the rotation of the polar zones are implemented according to the following equations where the rotated zone coordinates are expressed as:
$\phi$=latitude,
$\lambda$=longitude, and
The normal zone coordinates are expressed as:
$\phi^1$=normal latitude,
$\lambda^1$=normal longitude.
The relationship between the rotated and normal coordinates are determined by:

$$\cos \phi \sin \lambda = \cos \phi^1 \sin \lambda^1$$

$$\cos \phi \cos \lambda = -\sin \phi^1$$

$$\phi = \sin^{-1}(\sin \phi)$$

$$\lambda = \tan^{-1}(\sin \lambda / \cos \lambda)$$

solving for $\phi$ and $\lambda$:

$$\phi = \sin^{-1}(\cos \phi^1 \cos \lambda^1)$$

$$\lambda = \tan^{-1}(-\cos \phi^1 \sin \lambda^1 / \sin \phi^1).$$

As is best shown in FIG. 6, the distance between two latitudinal or longitudinal coordinates is $$\cos c = \cos a \cos b + \sin a \sin b \cos C \text{ (exact)}$$

which can be expressed approximately as $$\cos c = a^2 + b^2 - 2 \ ab \cos C \text{(approximate)}$$

where
$a = \pi/2 - \text{lat}_1$
$b = \pi/2 - \text{lat}_2$
$c = \text{lon}_2 - \text{lon}_1$.

In one embodiment of the present invention, the approximation is advantageously used for distances up to 100 nautical miles. The approximation for cos (c) introduces an error of approximately 2% at 200 nautical miles.

Referring now to FIG. 8, a flow chart of the steps employed by the invention for storage and retrieval of aeronautical chart data onto an optical disk image is shown. These steps include scanning the chart data into a pixel image 200, storing the pixel image in an intermediate data base 202, selecting control points for the pixel image to a 4, warping the pixel image from the intermediate data base into the tessellated sphere 206 and populating the optical disk by down-loading or down-sampling the pixel image from the spherical data base onto the optical disk image 208.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices and that various modifications, both as to the equipment details and operating procedures, can be accomplished without departing from the scope of the invention itself.

What is claimed is:

1. A method for the storage and retrieval of aeronautical chart data onto an optical disk image comprising the steps of:
   (a) scanning the chart data into a pixel image;
   (b) storing the pixel image into an intermediate data base;
   (c) selecting control points for the pixel image;
   (d) warping the pixel image from the intermediate data base into a spherical data base representative of a tessellated sphere having five zones, wherein the tessellated sphere is representative of the earth, wherein the five zones comprise formats representing a north polar zone, a north temperate zone, an equatorial zone, a south temperate zone and a south polar zone, and wherein the polar zones are created in the spherical data base by carrying over the format of the portion of the data base representing the equatorial zone and rotating the format 90 degrees;
   (e) populating the optical disk image by down sampling the pixel image from the spherical data base; and
   (f) displaying the data on a CRT display.

2. The method of claim 1 wherein the number of tessellations in the equatorial zone is 190.

3. The method of claim 1 wherein the number of tessellations in each of the north and south polar zones is 190.

4. The method of claim 1 wherein the number of tessellations in each of the north and south temperate zones is 152.

5. A method for the storage and retrieval of aeronautical chart data onto an optical disk image comprising the steps of:
   (a) scanning the chart data into a pixel image;
   (b) storing the pixel image into an intermediate data base;
   (c) selecting control points for the pixel image;
   (d) warping the pixel image from the intermediate data base into a spherical data base representative of a tessellated sphere having five zones wherein the tessellations for the zones are defined so as to cause an overlap of two rows where adjacent rows meet, and wherein the zone boundary is defined at the middle of the overlap; and
   (e) populating the optical disk image by down sampling the pixel image from the spherical data base.

* * * * *